(12) United States Patent
Park et al.

(10) Patent No.: US 7,981,237 B2
(45) Date of Patent: Jul. 19, 2011

(54) MICRO- OR NANO-FLUIDIC CHIP FABRICATED WITH NORLAND OPTICAL ADHESIVE AND BIOANALYSIS PLATFORM PRODUCED BY USING THE SAME

(75) Inventors: Sung Su Park, Seoul (KR); So Hyun Kim, Goyang-Si (KR); Youn Sang Kim, Goyang-Si (KR); Seong Won Nam, Seoul (KR); Kang Mu Lee, Seoul (KR)

(73) Assignee: Ewha University-Industry Collaboration Foundation, Seoul (KR)

( * ) Notice: Subject to any disclaimer, the term of this patent is extended or adjusted under 35 U.S.C. 154(b) by 334 days.

(21) Appl. No.: 11/871,227

(22) Filed: Oct. 12, 2007

(65) Prior Publication Data

US 2008/0253929 A1    Oct. 16, 2008

(30) Foreign Application Priority Data

Oct. 13, 2006  (KR) .................. 10-2006-0099754

(51) Int. Cl.
*G01N 33/00* (2006.01)
(52) U.S. Cl. ........ 156/246; 422/502; 422/68.1; 422/130; 156/261; 156/510; 436/3; 436/43; 216/24; 216/33; 216/37
(58) Field of Classification Search ............... 422/68.1, 422/99, 100, 102, 104, 130; 435/6; 216/24, 216/33, 37; 156/246, 261, 510; 436/529, 436/43; 264/248, 250, 331.19, 483, 494
See application file for complete search history.

(56) References Cited

U.S. PATENT DOCUMENTS

| 6,632,655 B1* | 10/2003 | Mehta et al. ............... 435/287.2 |
| 6,645,432 B1* | 11/2003 | Anderson et al. ............ 422/68.1 |
| 2003/0161572 A1* | 8/2003 | Johnck et al. ................... 385/14 |
| 2004/0134882 A1* | 7/2004 | Mei ................................ 216/40 |

OTHER PUBLICATIONS

Odemir et al., Oxygen Plasma Modification of Polyurethane Membranes, 2002, vol. 13, pp. 1147-1152.*
Rohit Pal, et al., "An integrated microfluidic device for influenza and other genetic analyses", Lap Chip (2005) vol. 5, pp. 1-9.
So Hyun Kim, et al., "Simple route to hydrophilic microluidic chip fabrication using an ultraviolet (UV)-cured polymer", Adv. Funct. Mater. (2007) in press.
Pal, et al., An Integrated Microfluidic Device for Influenza and Other Genetic Analyses, Lab on a Chip, 2005, 5:1-9.
Bartolo, et al., Microfluidic Stickers, Lab Chip, 2008, 8:274-279.

* cited by examiner

*Primary Examiner* — In Suk Bullock
*Assistant Examiner* — Sharon Pregler
(74) *Attorney, Agent, or Firm* — The PL Law Group, PLLC

(57) ABSTRACT

A micro- or nano-fluidic chip fabricated with a Norland Optical Adhesive (NOA), an acrylated polyurethane-based UV-polymerizable optical adhesive. The micro- or nano-fluidic chip has sequentially an inlet, a channel, and an outlet. The channel has a pillar in the region of the outlet to prevent beads from flowing out, and the surface of the channels in the micro- or nano-fluidic chip is hydrophilic, which generates spontaneous flow in the channels by a capillary force without any extra external pumping.

4 Claims, 6 Drawing Sheets

MICRO- OR NANO-FLUIDIC CHIP FABRICATED WITH NORLAND OPTICAL ADHESIVE AND BIOANALYSIS PLATFORM PRODUCED BY USING THE SAME

CROSS-REFERENCE TO RELATED APPLICATION

This application claims under 35 U.S.C. §119(a) on Korean Patent Application No. 10-2006-0099754 filed on Oct. 13, 2006, the entire contents of which are incorporated herein by reference.

BACKGROUND OF THE INVENTION (a) Field of the Invention

The present invention relates to Micro- or Nano-fluidic chip fabricated with Norland Optical Adhesive (NOA), an acrylated polyurethane-based UV-polymerizable optical adhesive, and bioanalysis platform produced by using the same.

(b) Background Art

A microfluidic chip fabricated by microfluidic technology is a chip containing micro-sized channels. In the microfluidic chip, a small amount of fluid flows through microchannels to make various reactions, which makes it possible to integrate the multiple, complicated laboratory processes on a single chip. Accordingly, it is also called as Lab-on-a-Chip (LOC). As a material for fabricating microchannels, various materials have been studied and used, such as glass, silica, polycarbonate, and poly(methylmethacrylate), poly(dimethylsiloxane) (PDMS). Recently, a nanofluidic chip containing nano-sized channels has been also studied actively, which allows even single molecule detection.

Norland Optical Adhesive (NOA), which is a commercial product developed as an optical adhesive, is a clear, colorless liquid polymer at ambient temperature that will cure when exposed to ultraviolet light. The fully cured NOA is also colorless and clear. Further, the fully cured NOA has an optical properties of a wide spectral range, and mechanical properties of not being easily deformed such as shrinking or expanding due to its hardness. On the basis of those mechanical properties, NOA was suggested as an alternative material in fabricating nanostructures, for substituting the conventional materials such as PDMS.

Capillarity is a phenomenon associated with surface or interfacial tension, and a spontaneous movement of liquids along narrow tubes. PDMS widely used in fabricating microchannels is extremely hydrophobic, in which an extra pumping system is needed in order to flow fluid inside microchannels. However, in the related field, an ideal device is mostly a device having microchannels in which fluid flows by a capillary force without extra external pumping. Accordingly, there are many studies in progress in order to develop such device, and the following methods were reported: a method that PDMS is exposed to energy such as oxygen plasma and UV/ozone to make the surface hydrophilic; a method of further coating with hydrophilic molecules after the above surface treatment; and a method of multiple coating with hydrophilic molecules using sol-gel chemistry.

A microfluidic device is considerably applicable in construction of a bioanalysis platform. A microfluidic chip allows quick immunoassay or DNA even with a very small amount of sample, as well as performing the pretreatment step such as PCR and cell lysis on a single chip. Subsequently, a portable and usable bioanalysis platform has been developed. The bioanalysis platform is expected to play a critical role in realizing POC (point-of-care) of performing diagnostic testing at or near the site of patient care.

SUMMARY OF THE INVENTION

It is an object of the present invention to provide a micro- or nano-fluidic chip fabricated with a NOA.

It is another object of the invention to provide a bioanalysis platform produced by a micro- or nano-fluidic chip fabricated with a NOA.

It is still another object of the invention to provide a method for fabricating a micro- or nano-fluidic chip with a NOA.

The present invention provides a micro- or nano-fluidic chip fabricated with a NOA.

The invention provides a micro- or nano-fluidic chip comprising sequentially an inlet, a channel, and an outlet, wherein the channel has pillars in the region of the outlet to prevent beads from flowing out.

The invention provides a micro- or nano-fluidic chip wherein the channel of the inner surface of the fluidic chip fabricated with a NOA is treated with oxygen plasma.

The invention provides a bioanalysis platform comprising a micro- or nano-fluidic chip packed with beads.

The invention provides a bioanalysis platform, wherein proteins are immobilized on the beads.

The invention provides a method for fabricating a micro- or nano-fluidic chip with a NOA comprising sequentially an inlet, a channel, and an outlet, which comprises the steps of: fabricating channel layer by pouring a NOA over a master mold and curing it; fabricating top cover layer by coating NOA on a film with punched holes corresponding to the inlet and the outlet of the channel and curing it; and bonding the channel layer and the top cover layer on a hot plate and curing them.

The invention provides the method for fabricating a micro or nanofluidic chip, further comprising a step of treating the surface of the channel layer with oxygen plasma.

The surface of channels in the micro- or nano-fluidic chip of the invention is hydrophilic, which generates spontaneous flow in the channels by a capillary force without any extra external pumping. The surface of channels in the NOA micro- or nano-fluidic chip of the invention is treated with oxygen plasma to introduce permanent hydrophilicity.

In the invention, the channels in NOA microfluidic chip are packed with protein-immobilized beads by a capillary force and gravity without any extra external pumping to produce a bioanalysis platform.

The NOA (Norland Optical Adhesive, brand name of Norland Products Inc.) is an acrylated polyurethane-based, clear, colorless, and liquid photopolymerizable polymer compound, which can cure when exposed to ultraviolet light. The NOA is available from Norland Products Inc.

DETAILED DESCRIPTION

Hereinafter, the present invention will be described in detail with reference to drawings.

1. NOA Micro- or Nano-Fluidic Chip Construction

Figure 1:
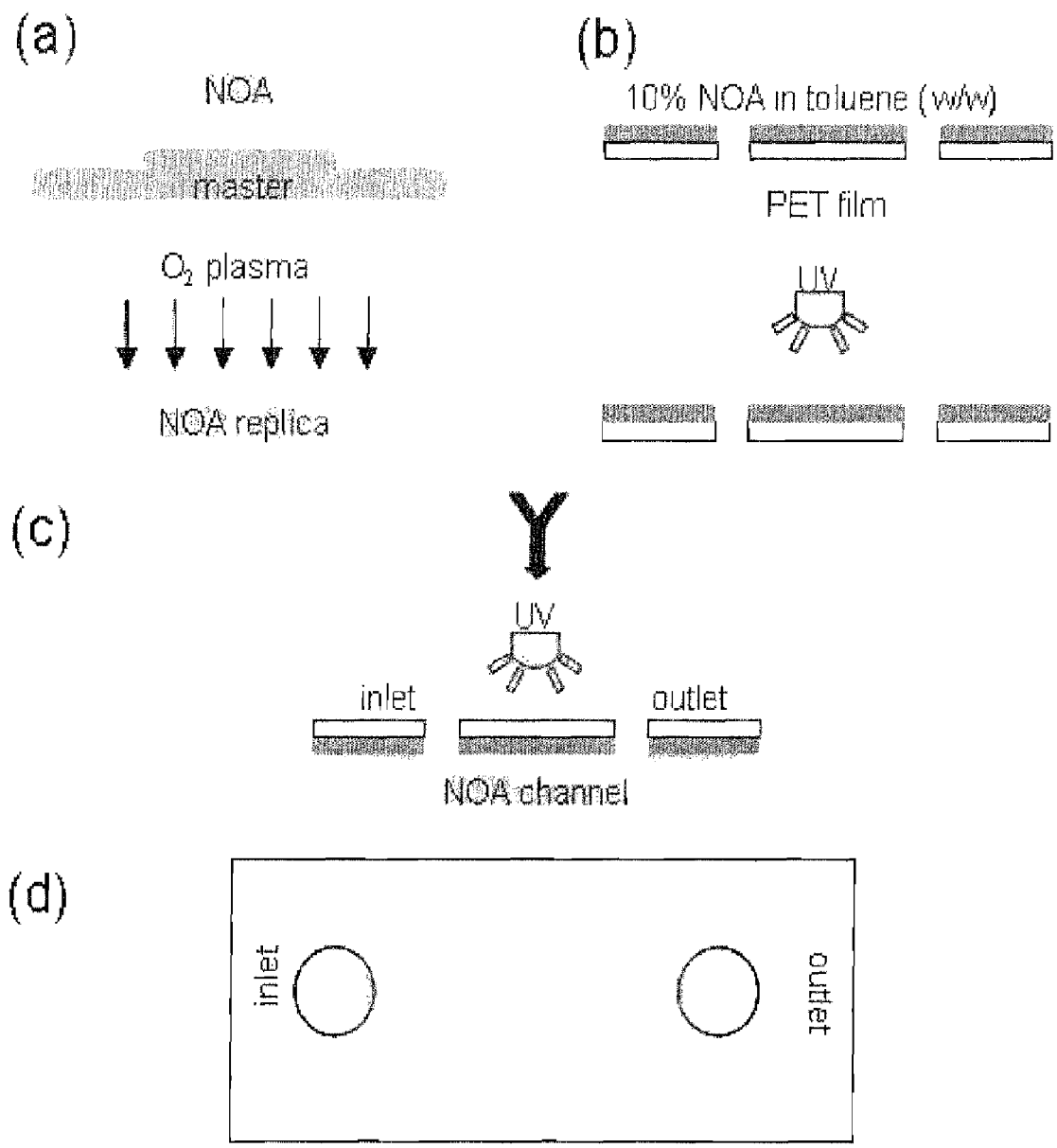
FIG. 1 is a schematic diagram of a process for fabricating a NOA micro- or nano-fluidic chip with a NOA.

FIG. 1 is a schematic diagram of a process for fabricating a NOA micro- or nano-fluidic chip.

The method for fabricating channel layer in the microfluidic chip is as follows. First, the NOA is poured over master mold and cured under UV light for about 1 hour. Then, the cured NOA replica is peeled off the master mold, and cured again under UV light for about 12 hours. The method can further comprise treating the surface of the cured NOA channel layer with oxygen plasma. The treatment may increase the hydrophilicity of the channel surface.

The top cover layer is fabricated by spin coating of a 10% (w/w) NOA in toluene on a film which was punched holes for inlet and outlet ports and curing under UV light for about 5 minutes. The channel layer and the top cover layer are bonded on a hot plate heated at 60° C., and cured harder under UV light for 2 hours to fabricate a NOA microfluidic chip.

Figure 2:
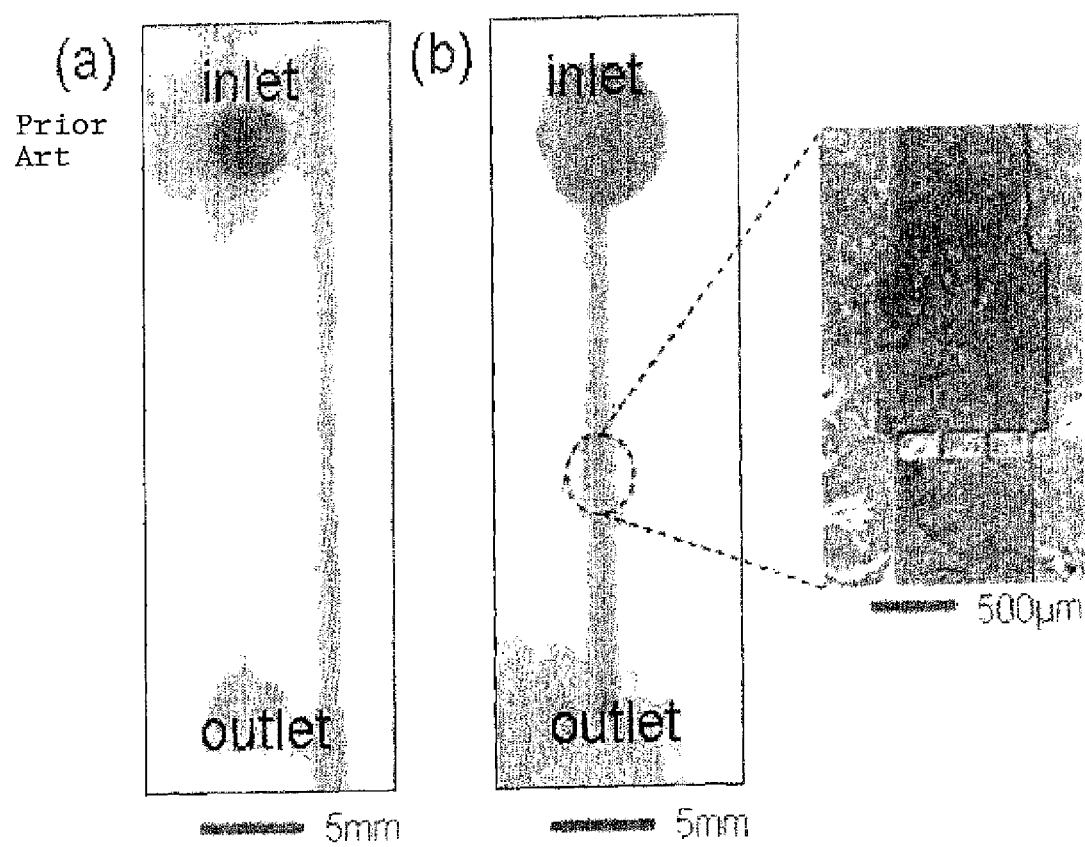
FIG. 2 illustrates generation of spontaneous flow through a microchannel in NOA microfluidic chip treated with oxygen plasma (FIG. 2(b)), in contrast to PDMS microfluidic chip treated with oxygen plasma (FIG. 2(a)).

FIG. 2(a) and FIG. 2(b) show the spontaneous flow through a microchannel in the NOA microfluidic chip treated with oxygen plasma, in contrast to the PDMS microfluidic chip treated with oxygen plasma. As shown in FIG. 2(b), microchannel was filled with a fluid by a capillary force without any extra external pumping in the NOA microfluidic chip. In contrast, as shown in FIG. 2(a), the spontaneous flow through a microchannel in PDMS microfluidic chip was not completed and stopped at the inlet port of the channel.

Figure 3:
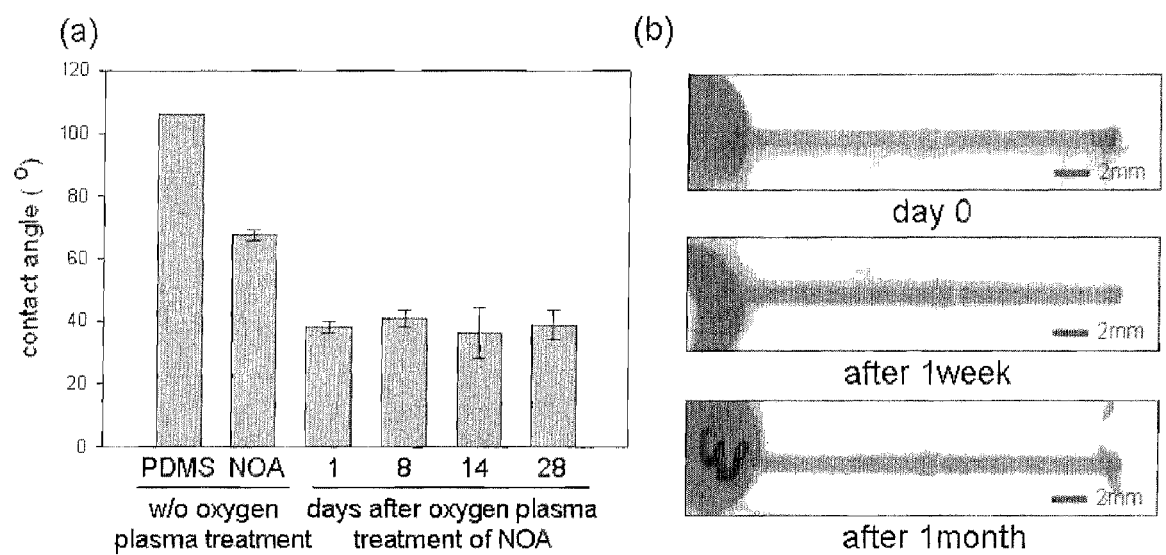
FIG. 3(a) shows that the hydrophilicity of NOA channels was maintained even 1 month after oxygen plasma treatment.
FIG. 3(b) shows that spontaneous flow in NOA channels by a capillary force was observed even 1 month after chip fabrication.

FIG. 3(a) shows that the hydrophilicity of NOA channels was maintained even 1 month after oxygen plasma treatment. Further, FIG. 3(b) shows that spontaneous flow by a capillary force was also observed even 1 month after fabrication of a chip.

2. Construction of Bioanalysis Platform

Figure 4:
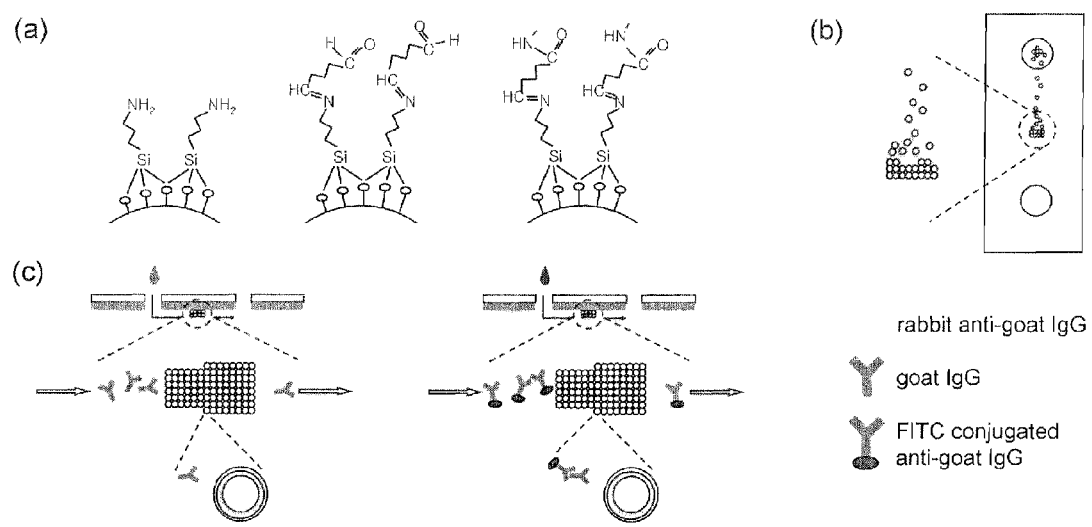
FIG. 4 shows a schematic diagram for construction of a hand-held bioanalysis platform using a NOA microfluidic chip.

FIG. 4 shows a schematic diagram for construction of a hand-held bioanalysis platform using a NOA microfluidic chip. Hereinafter, the construction method of bioanalysis platform will be explained with reference to FIG. 4.

First, biomaterials are immobilized on the surface of the beads and then beads are packed within the channels. FIG. 4(a) shows the steps of a process for immobilization of an antibody as an example of the biomaterials immobilized on the surface of the beads. Antibodies can be immobilized on the surface of the glass beads by inducing sequentially an amino group and an aldehyde group. The method for inducing sequentially the amino group and the aldehyde group on the surface of the glass beads is as follow. Firstly, the glass beads are reacted with 10% (v/v) amino silane in toluene for 24 hours, to form self-assembled monolayers (SAMs) of amino silane on the surface of the beads. After washing and drying the beads, they are treated with 2.5% (v/v) glutaraldehyde in a 10 nM borate buffer to subject glutaraldehyde to react with the amino group on the surface of the beads. Thus, an aldehyde group is formed on the outermost surface of the beads, on which antibodies are immobilized.

FIG. 4(b) illustrates a process for packing the beads into the channel. In the packing steps, the channels are compactly packed with beads by a capillary force and gravity without any extra external pumping. The capture antibody-immobilized glass beads were packed in the middle of the NOA channels for immunoassay. After filling the channels with PBS buffer by capillary force, the buffer containing the antibody-immobilized beads was dropped into the inlet of each channel. Then, the beads in fluid spontaneously flew into the channel and were trapped by pillar structures in the middle of the microchannel, due to the gap size (40 µm) between the pillars, which is smaller than the diameter of glass beads (60 µm). The beads seemed to be packed more compactly by gravity as well as capillary force by placing the chips in vertical. The chips were dehydrated and stored in vacuum until assays.

The bioanalysis platform is dehydrated and stored under vacuum until assay. After taking it out in air for an assay, the droplets of samples are introduced to the inlet port, which spontaneously fill the channels by capillary force, thus leading to the target analysis. If target analytes exist in the sample solution, the solution flows in the channels, target analytes are captured by biomaterials (for example, an antibody binding to target analytes) immobilized on beads in channels to detect them by fluorescence, or the like. FIG. 4c shows an example of immunoassays using the platform. For an assay, only droplets of target analyte (goat IgG) and FITC-tagged secondary antibody (FITC tagged anti-goat IgG) solution were sequentially introduced to an inlet port, which spontaneously filled the channel, thus leading to the target analysis.

Figure 5:
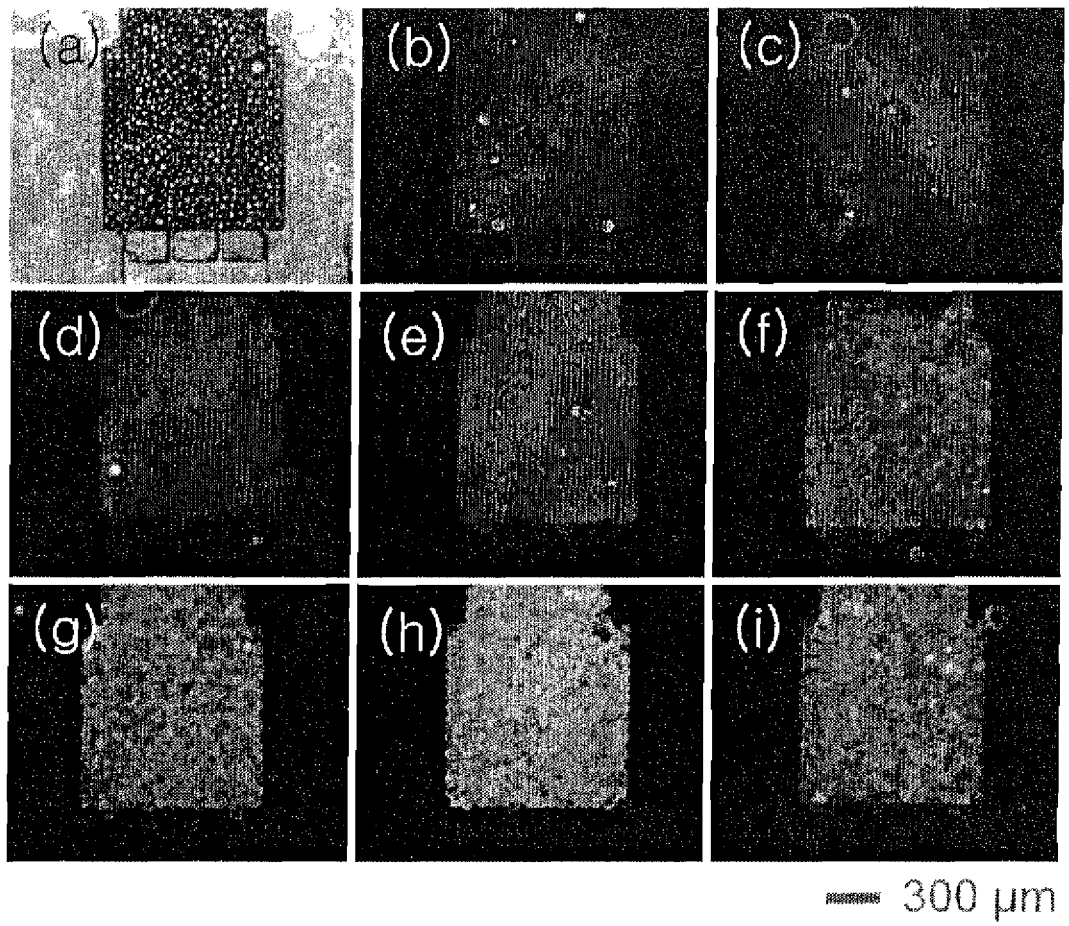
FIG. 5 shows micrographs of NOA immunoassay platforms constructed by packing with capture antibody (rabbit anti-goat IgG)-immobilized glass beads: (a) an optical micrograph of NOA immunoassay platform and (b-i) fluorescence micrographs (measured at 488 nm) of NOA immunoassy platforms after assays with (c) 100 pg/ml, (d) 1 ng/ml, (e) 10 ng/ml, (f) 100 ng/ml, (g) 1 µg/ml, (h) 10 µg/ml, (i) 100 µg/ml target analytes (goat IgG) or (b) without target analytes.

FIG. 5 shows the binding of FITC-tagged anti-goat IgG to target analytes (goat IgG) captured by capture antibodies immobilized on glass beads inside NOA microchannels. Fluorescence detected by nonspecific binding of FITC-tagged anti-goat IgG to capture antibodies immobilized on glass beads was slightly more than negligible (FIG. 5b). The NOA microfluidic devices generated green fluorescence when target analytes were introduced. In the devices packed with almost same volumes of capture antibody-immobilized glass beads, in general, higher intensities were generated when higher concentration of target analytes were introduced (FIG. 5c-i).

Figure 6:
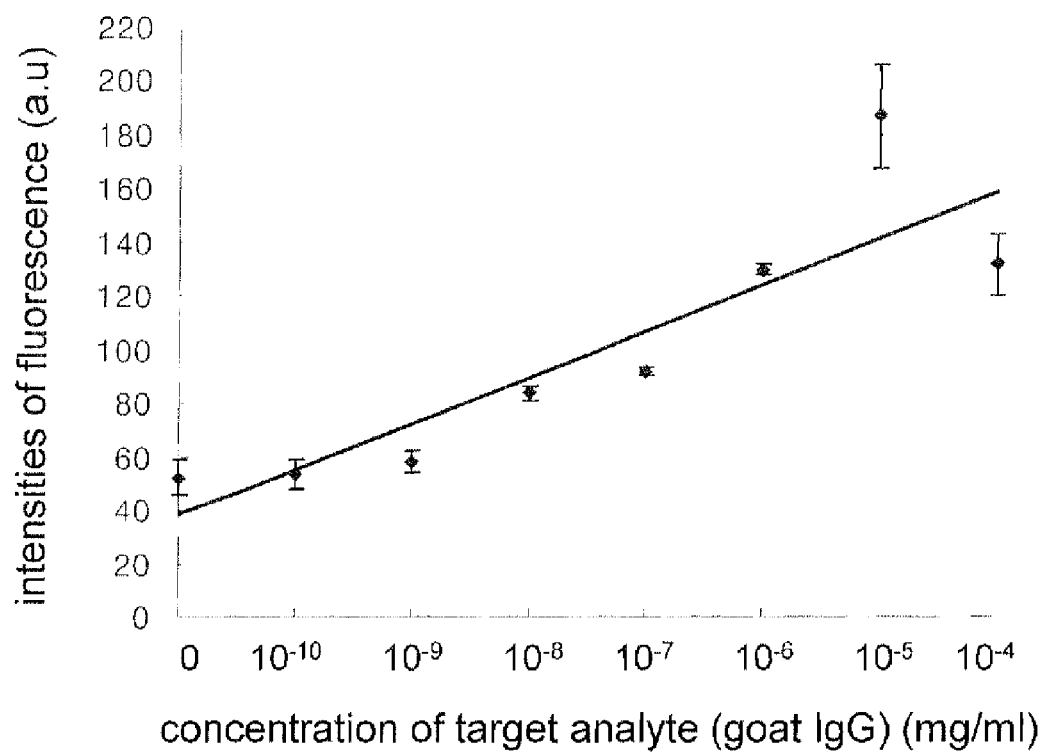
FIG. 6 shows fluorescence intensities measured in NOA immunoassay platforms performed assays with different concentration (0, $10^{-10}$, $10^{-9}$, $10^{-8}$, $10^{-7}$, $10^{-6}$, $10^{-5}$, $10^{-4}$ mg/ml) of target analytes (goat IgG)

FIG. 6 shows quantitative analysis of fluorescence intensities measured in NOA immunoassy platforms packed with same volume of glass beads on which capture antibodies immobilized. When target analytes were introduced at a varying range from 100 pg/ml to 100 µg/ml, all of the fluorescence intensities were high enough to be distinguished from the fluorescence intensities of the NOA chips which had no chances to meet target analytes. There was also linear correlation between detected fluorescence intensities and concentration of target analytes at specific range of concentration (from 100 pg/ml to 1 µg/ml). Over all the data demonstrates that not only qualitative but also quantitative analysis can be done with NOA microfluidic immunoassay platforms at a specific range of antibodies or antigens.

What is claimed is:

1. A method for fabricating a micro- or nano-fluidic chip, the method comprising the steps of:
   i) fabricating a channel layer consisting of an acrylated polyurethane-based UV-polymerizable optical adhesive and having sequentially an inlet, a channel, and an outlet by pouring the acrylated polyurethane-based UV-polymerizable optical adhesive over a master mold and curing the acrylated polyurethane-based UV-polymerizable optical adhesive;

ii) fabricating a top cover layer by preparing a film having holes corresponding to the inlet and the outlet of the channel, coating the acrylated polyurethane-based UV-polymerizable optical adhesive on the film and curing the acrylated polyurethane-based UV-polymerizable optical adhesive; and iii) bonding the channel layer obtained from step i) and the acrylated polyurethane-based UV-polymerizable optical adhesive coating of the top cover layer obtained from step ii) on a hot plate and curing the channel layer and the acrylated polyurethane-based UV-polymerizable optical adhesive coating under ultra-violet light, wherein the channel layer surface is treated with oxygen plasma after step i).

2. The method of claim 1, wherein the film in the step ii) is a polyethylene terephthalate film.

3. The method of claim 1, wherein the channel has a pillar in the region of the outlet to prevent a plurality of beads from flowing out.

4. The method of claim 1, wherein the channel layer is a single layer.

* * * * *